March 24, 1931.     S. L. WILLIAMS     1,797,388
VARIABLE LOAD BRAKE
Filed May 11, 1929
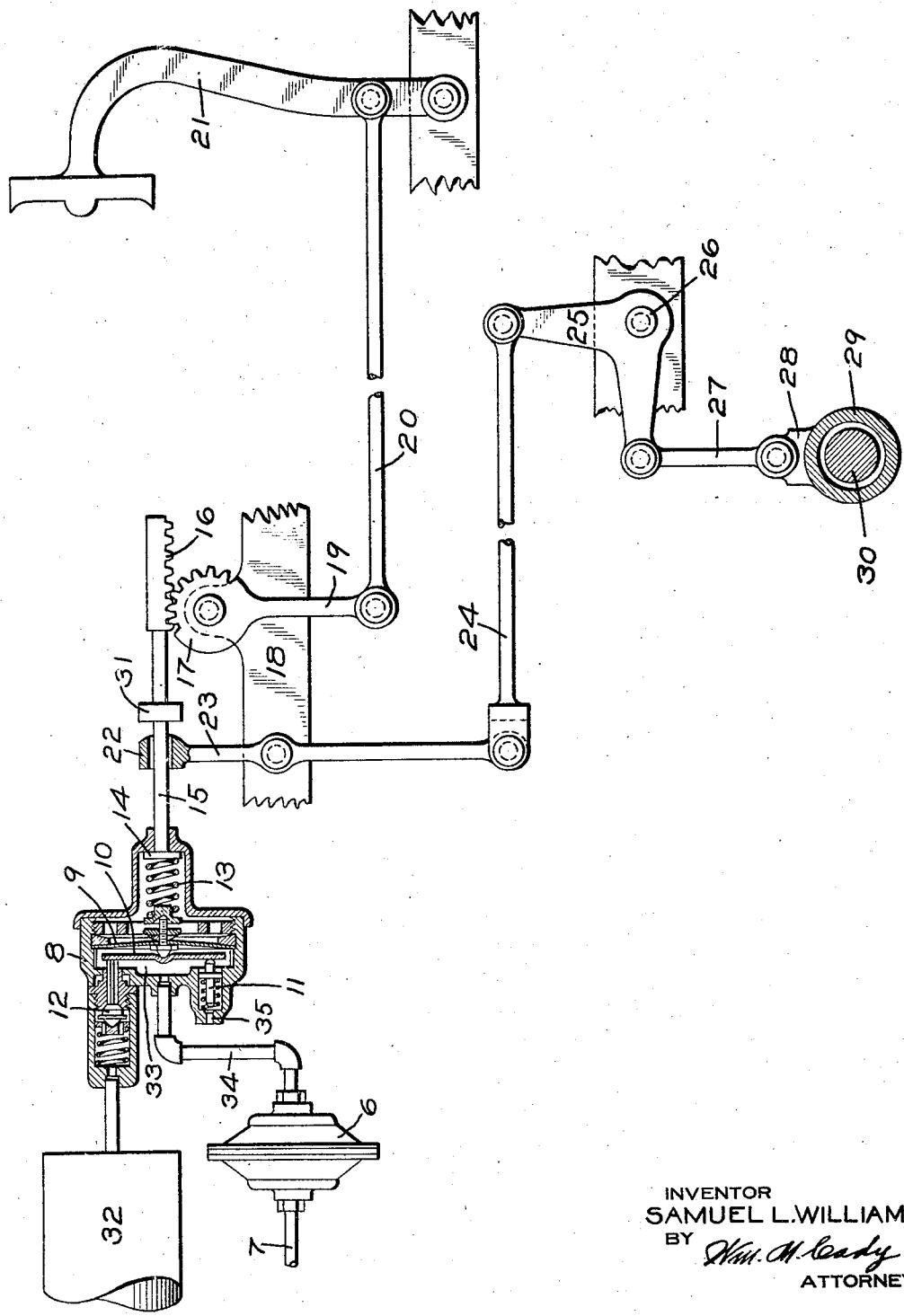
INVENTOR
SAMUEL L. WILLIAMS
BY *Will. M. Cady*
ATTORNEY Patented Mar. 24, 1931

1,797,388

UNITED STATES PATENT OFFICE

SAMUEL L. WILLIAMS, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA

VARIABLE-LOAD BRAKE

Application filed May 11, 1929. Serial No. 362,371.

This invention relates to brakes and more particularly to fluid pressure actuated brake equipment for automotive vehicles.

An object of the invention is to provide a fluid pressure actuated brake apparatus in which the maximum power with which the brakes may be applied is varied according to the load.

Another object of the invention is to provide improved means for regulating the fluid pressure in an automotive vehicle fluid pressure brake equipment according to variations in the load on the vehicle.

Another object of the invention is to provide a variable load brake equipment for automotive vehicles having fluid pressure brakes, in which the maximum power with which the brakes may be applied is controlled by a movable stop member, the relative position of which is shifted according to variations in the load on the vehicle.

Another object of the invention is to provide an improved variable load brake equipment of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic view, partly in section, of a load brake equipment embodying the invention.

Automotive vehicles equipped with fluid pressure brake apparatus are usually provided with a lap type brake valve which is operated by the brake pedal lever to control the flow of fluid under pressure to or from the brake chambers. The construction of the brake valve is such that a given movement of the brake pedal causes a corresponding fluid pressure increase or decrease in the brake chambers.

It is obvious that under these conditions it is necessary for the vehicle operator to exercise judgment as to the maximum pressure which should be built up in the brake chambers for braking purposes, this judgment being based primarily on the load on the vehicle. When the load on the vehicle is increased, the brake chamber fluid pressure should also be proportionately increased so as to increase the braking force.

The lap type brake valve may be provided with a flexible member subject on one side to the pressure of a spring and on the opposite side to the brake chamber fluid pressure. The flexible member is adapted to operate a fluid supply valve and an exhaust valve. When the pressure on the spring side of the flexible member is less than the pressure on the valve side of said member, the supply valve is closed and the exhaust valve is open. However, when the spring pressure is increased, the flexible member is moved to unseat the supply valve and seat the exhaust valve. When the supply valve is thus unseated, fluid under pressure is supplied to the brake chambers until the brake chamber pressure overbalances the spring pressure, whereupon the flexible member is moved by the fluid pressure in a direction away from the supply valve, thereby permitting said supply valve to seat. Since the exhaust valve remains seated, the fluid under pressure in the brake chambers is bottled up, and the brakes are held applied.

Heretofore, the brake valve device could be manipulated to supply fluid to the brake chambers up to the maximum pressure of fluid available according to the degree to which the spring was compressed, regardless of whether the vehicle was loaded or unloaded, but according to the present invention, means are provided for limiting the degree to which the spring may be compressed, as the load on the vehicle is varied.

Obviously, if the degree to which the valve spring may be compressed is increased in proportion as the load is increased, then it will require a corresponding increase in brake chamber pressure to overbalance the spring pressure, and accordingly the maximum pressure of brake chamber fluid is also increased.

For the purpose of regulating the compression of the brake valve spring, a stop member is provided for limiting the movement of the spring compressing member. The positioning of the stop member in accordance with variations of the load on the vehicle is effected through a system of levers, which are actuated by an increase or decrease in the load.

Referring to the drawing, the load brake equipment may comprise one or more brake chambers 6 (only one being shown in the instant case), each brake chamber containing a flexible diaphragm (not shown) adapted to be operated by fluid under pressure for projecting a push rod 7. The push rod 7 may be connected to the rigging (not shown) through which the brakes of the automotive vehicle are applied and released.

For controlling the fluid pressure brakes, a valve device may be provided comprising a casing 8 having a diaphragm chamber containing a flexible diaphragm 9. The diaphragm 9 carries a member 10 which engages the stem of an exhaust valve 11 and the stem of a supply valve 12, for controlling said valves upon movement of the diaphragm.

A spring 13 acts on the opposite side of the diaphragm 9 and engages a head 14 on the end of a rod 15.

The rod 15, at its opposite end, is formed with a series of teeth 16 which mesh with the teeth of a segment gear 17 pivotally mounted to the vehicle frame 18.

The gear 17 has an arm 19 extending therefrom, the end of the arm being pivotally connected to a rod 20 which in turn is connected to the brake pedal lever 21 of the vehicle.

The rod 15 is inserted through an eye 22 on one end of a lever 23 fulcrumed to the vehicle frame 18. The opposite end of the lever 23 is pivotally connected to a rod 24 which in turn is connected to one arm of a bell crank 25.

The bell crank 25 is fulcrumed, by means of a pin 26, to the vehicle frame, and the other arm of said bell crank is pivotally connected to a link 27 which in turn is connected to a bracket 28 on the housing 29 of the vehicle axle 30.

Between the toothed portion of the rod 15 and the portion thereof which passes through the eye 22, the rod 15 is formed with an enlarged portion or collar 31.

Assuming that the vehicle is unloaded, if it is desired to apply the brakes, the pedal lever 21 is depressed by the foot of the operator, causing a forward movement of the rod 20. This action turns the gear 17 in a counter clock-wise direction and the rod 15 is moved toward the left, compressing the spring 13. The diaphragm 9 is then operated by the pressure of spring 13 to close the exhaust valve 11 and open the supply valve 12.

Fluid under pressure from reservoir 32 is then admitted to diaphragm chamber 33 and from thence flows through pipe 34 to the brake chamber 6. The diaphragm in the brake chamber is thereupon operated to project the push rod 7 in the usual manner to effect the application of the brakes.

When the brake chamber fluid pressure increases a predetermined amount, the pressure of the fluid in diaphragm chamber 33, acting on the diaphragm 9, flexes the same outwardly against the pressure of spring 13. Should the fluid pressure in chamber 33, acting on the diaphragm 9, increase an amount sufficient to overbalance the pressure of spring 13, the diaphragm will move away from the supply valve 12 an amount sufficient to permit the supply valve 12 to seat, thereby cutting off the supply of fluid under pressure from the reservoir 32 to the brake chamber 6. Should a greater braking force be required, the pedal lever 21 may be further depressed to further compress the spring 13, so as to operate the diaphragm 12, and thereby cause fluid under pressure to be again supplied to the brake chamber 6 in the manner hereinbefore described, and this process may be repeated until the collar 31 abuts the eye 22, when no further compression of the spring 13 can be effected, since the pedal lever 21 is thereby prevented from moving so as to further compress the spring. When the brake chamber pressure exceeds the maximum pressure of the spring 13 thus permitted according to the load, the supply valve 12 will be seated in the manner heretofore described. Inasmuch as the exhaust valve 11 will remain seated, the fluid under pressure will be retained in the brake chamber 6 until it is desired to release the brakes.

The brakes may be released by relieving the foot pressure on the pedal lever 21, so that the compression of spring 13 being reduced, the diaphragm 9 will be moved by the brake chamber pressure acting on the opposite side to open the exhaust valve 11 and thereby permit the exhaust of fluid from the brake chamber 6 through the open exhaust port 35.

It is to be noted that when the vehicle carries a light load, or is unloaded, the relative position of the eye 22 and collar 31 is such as to prevent any considerable movement of the rod 15 when the pedal lever 21 is depressed for effecting an application of the brakes. Consequently, the movement of the rod 15 being limited, the amount the spring 13 is compressed will also be limited. Therefore, the pressure of the spring 13 against the diaphragm 9 is limited to the amount required to obtain maximum brake chamber pressure when the vehicle is unloaded.

This fluid pressure, it will be understood, is considerably less than the amount of fluid pressure required to effect an application of the brakes when the load on the vehicle is increased. Therefore, when the load on the vehicle is increased, the downward movement of the vehicle body, which carries the bell crank 25, relative to the vehicle axles, causes a clockwise movement of the bell crank 25, so that the rod 24 is pulled toward the right, thereby swinging the lever 23 in a counter clock-wise direction. In this way the eye 22 is moved to the left, increasing the distance between it and the collar 31 on the spring compressing rod 15, so as to permit greater movement of the rod 15 when the brake pedal 21 is depressed, in the manner heretofore described, to effect an application of the brakes. In this way the permitted compression of the spring 13 is increased in proportion to the increase in load on the vehicle. With the permitted compression of the spring 13 thus increased, it will require a greater increase in fluid pressure in the chamber 33, when the valve mechanism is actuated to supply fluid under pressure to the brake chamber 6, to flex the diaphragm 9 outwardly. Thus, when the device is operated to unseat the supply valve 12, a greater amount of fluid under pressure will be admitted to the chamber 33 and to the brake chamber 6 than is the case when the vehicle is unloaded, since it will require a greater force acting on the diaphragm 9 from the side opposite to the spring 13, to flex the diaphragm away from the stem of the supply valve 12 an amount sufficient to permit the supply valve to seat.

It will thus be seen that the maximum pressure of fluid supplied to apply the brakes is limited according to the load on the vehicle, the maximum pressure limit being varied as the load on the vehicle is varied.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a load regulated brake, the combination with a brake chamber, of valve means subject on one side to the pressure of a spring, for regulating the fluid under pressure supplied to the brake chamber, a rod for compressing the spring, means for operating the rod, an enlargement formed on the rod, a lever having an eye through which the rod is passed, and means for shifting the position of the lever according to the load.

2. In a load regulated brake, the combination with a brake chamber, of valve means subject on one side to the pressure of a spring, for regulating the fluid under pressure supplied to the brake chamber, a rod for compressing the spring, a rack formed on the rod, a gear engaging the rack, means for operating the gear, an enlargement formed on the rod, a lever having a portion disposed in the path of the enlargement, and means for shifting the position of the lever according to the load.

In testimony whereof I have hereunto set my hand, this 7th day of May, 1929.

SAMUEL L. WILLIAMS.